May 26, 1953 R. P. HEUER 2,639,993
BASIC REFRACTORY BRICK AND PROCESS
Filed Dec. 31, 1949
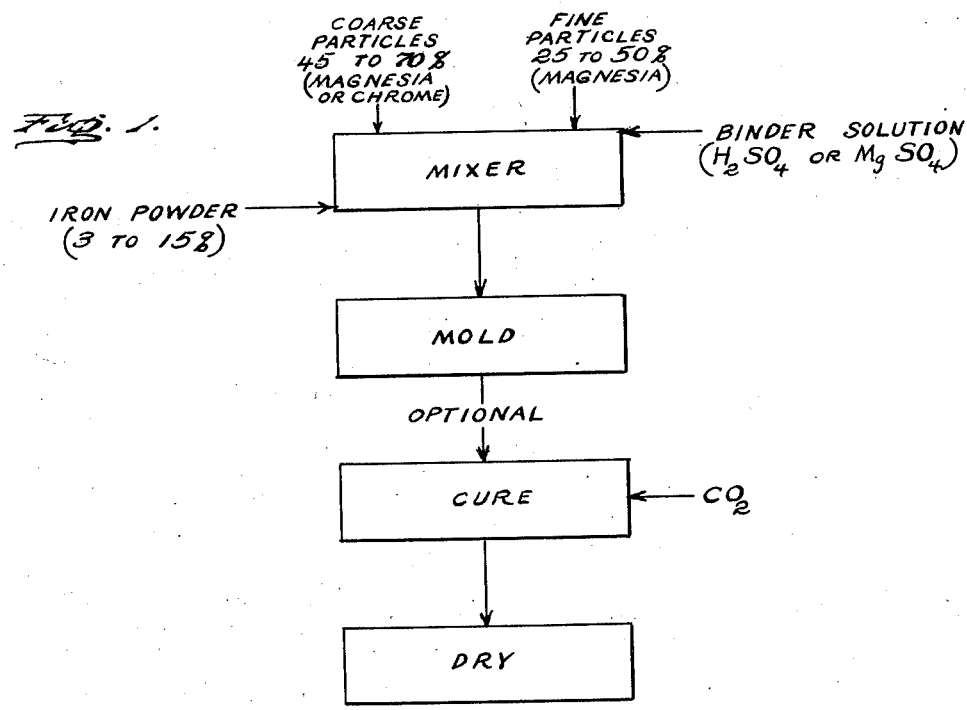
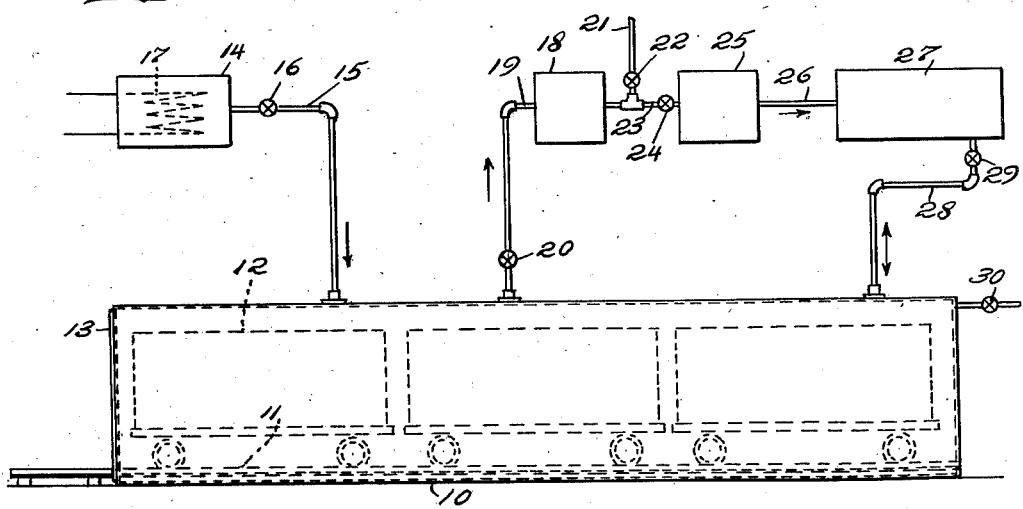
INVENTOR
RUSSELL PEARCE HEUER.
BY
ATTORNEYS Patented May 26, 1953

2,639,993

UNITED STATES PATENT OFFICE 2,639,993

BASIC REFRACTORY BRICK AND PROCESS

Russell Pearce Heuer, Villanova, Pa., assignor to General Refractories Company, a corporation of Pennsylvania Application December 31, 1949, Serial No. 136,354

17 Claims. (Cl. 106—59)

The present invention relates to the manufacture of refractory brick and other products which predominately contain magnesia, as calcined magnesia (periclase or dead-burned magnesite) or electrically fused magnesia, and which are suitable for use without kiln firing.

A purpose of the invention is to obtain an improved strength or modulus of rupture at intermediate temperatures in unfired basic refractory brick.

A further purpose is to avoid or minimize the shrinkage which may occur in the linear dimensions of unfired basic refractory brick when they are heated to high temperatures.

A further purpose is to use 45 to 70 percent (preferably 50 to 60 percent) of coarse magnesia particles between 6 and 35 mesh and preferably between 8 and 35 mesh, from 25 to 50 percent of fine magnesia particles which pass through 48 mesh, and preferably through 65 mesh, and from 3 to 15 percent, preferably 8 to 12 percent, of finer particles of metallic iron which pass through a 28 mesh per linear inch screen and preferably pass through a 35 mesh per linear inch screen, with a suitable bonding agent such as sulphuric acid or magnesium sulphate and water, to form the mix into brick under suitable molding pressure and to cure and dry, or dry the brick, without kiln firing.

A further purpose is to replace the coarse magnesia particles either partially or entirely by coarse chromite particles which are of a size between 6 and 28 mesh per linear inch.

A further purpose is to cure the molded brick with carbon dioxide gas to improve the low temperature strength of the brick.

Further purposes appear in the specification and in the claims.

In the drawings Figure 1 is a chart showing the steps in the process.

Figure 2 is a diagrammatic view of apparatus for curing of the brick with carbon dioxide.

In my U. S. Patent No. 1,859,512 I describe a magnesia refractory suitable for use without kiln firing which is bonded with about 4 percent of clay and sodium acid sulphate. My U. S. Patent No. 1,992,482 describes a similar composition.

In producing the magnesia refractories of my patents just mentioned, I have found that unfired refractories thus made and exposed to furnace temperature during use suffer a substantial loss in strength at intermediate temperatures such as 800° C. to 1200° C. This is due to the fact that the bond which is formed during the curing or drying of the brick comprises magnesia compounds containing water and volatile components. Upon heating to elevated temperatures, these compounds are destroyed and the strength of the brick is lowered substantially. When the brick is heated to a temperature of 1500° C. new ceramic bonds are formed which offset the loss of the low temperature bonds. However, even while the furnace is operating at 1500° C., a substantial thermal gradient prevails in the brick walls, so that a portion of the brick a few inches back from a hot face maintained at 1500° C. may be heated to a temperature in the range from 800° to 1200° C., and may never reach a temperature of 1500° C. This part of the brick which operates at intermediate temperatures may therefore suffer from lack of strength.

Very considerable stresses are developed in the brick during operation of the furnace, and as a result of these stresses cracks may develop behind the hot face which will cause the hot face to break off. This character of failure has been frequently encountered. It is thus very important to develop an increased strength at intermediate temperatures in unfired basic refractory brick.

I have discovered that by incorporation in the refractory mix of from 3 to 15 percent of metallic iron powder which is fine enough in particle size to pass through a 28 mesh per linear inch screen and preferably through a 35 mesh per linear inch screen, much of the difficulty above referred to can be overcome. I prefer to use a refractory mix of coarse and fine magnesia particles, the coarse particles constituting from 45 to 70 percent (preferably 50 to 60 percent) of the total mix and being sized to pass through a 6 mesh per linear inch screen and preferably through an 8 mesh per linear inch screen and to rest upon a 35 mesh per linear inch screen. I likewise prefer to employ from 25 to 50 percent of fine magnesia particles which pass through a 48 mesh per linear inch screen and preferably through a 65 mesh per linear inch screen. Fine chromite of the same size may be substituted for fine magnesia, but for best results the amount of chromite finer than 35 mesh per linear inch should be kept to a minimum, although for many purposes up to ten percent of fine chromite may be employed. From 3 to 15 percent and preferably from 8 to 12 percent of iron powder is used in the mix, which completes the refractory composition except for the bond in the preferred embodiment.

In making up the refractory, it is preferable to first mix the coarse and fine refractory particles together in a wet pan or other suitable mixer and then moisten them with the binder solution. The binder may be sulphuric acid in the proportion of 0.5 to 3 percent on the weight of the total dry refractory components of the mix, along with 2 to 5 percent of water on the weight of the total dry refractory components, preferably about 1 percent of acid and 4 percent of water.

Where magnesium sulphate is used instead of sulphuric acid, I preferably use 0.5 to 3 percent of anhydrous magnesium sulphate on the weight of the total dry refractory components, with 2 to 5 percent of water on the total dry refractory components, preferably 1.3 percent of anhydrous magnesium sulphate with 4 percent of water.

In the case of sulphuric acid as a binder it is important to mix the sulphuric acid with the refractory and allow it to react before the iron powder is added, and then continue mixing to incorporate the iron powder. Where magnesium sulphate solution is used as a binder, however, this order of mixing is not important.

The mix containing the coarse and fine refractory particles, the iron powder, the binder and the water, is molded into the desired refractory shape after the mixing is complete, desirably proceeding with sufficient promptness so that the iron powder does not become heavily oxidized prior to molding. The molding can be accomplished in hydraulic or mechanical presses as well known in the art, using pressures in excess of 1,000 p. s. i., preferably more than 5,000 p. s. i. and still better in excess of 10,000 p. s. i. applied to the brick surface. Jolting, impacting or other molding means may be used as an alternative to the forming press.

After molding, the brick may if desired be directly dried, preferably employing drying temperatures up to 150° C. The brick are then ready for use without kiln firing. Figure 1 illustrates in chart form the sequence of steps in making the brick.

As an alternate to the direct drying of the molded brick, the brick may desirably be cured with carbon dioxide gas before the drying. Where curing is to be employed, the molded brick as they are formed are placed in a suitable gas tight chamber which is evacuated and then filled with carbon dioxide gas, preferably at a gage pressure of about 15 p. s. i. Higher pressures may be used up to any desired pressure, but are not necessary. The exposure to carbon dioxide gas is maintained for at least one hour and preferably about six hours or longer at room temperature whereupon the brick are removed from the treating chamber and dried, suitably at temperatures up to 150° C. for times as long as 36 hours.

The technique used in curing may follow that of my copending application Ser. No. 756,001, filed June 20, 1947, for Unburned Refractory Brick Making, now Patent No. 2,547,323, April 3, 1951. As shown in Figure 2, a treating chamber 10 of steel or the like has a bottom track 11 to receive cars 12 through a suitably sealed door 13. The chamber is capable of withstanding a vacuum of 29 inches of mercury and a pressure of at least 1 atmosphere. A source of carbon dioxide gas is provided at 14 connected to the treating chamber by a pipe 15 through a valve 16. The source may be Dry Ice heated by a steam coil 17.

The treating chamber 10 is provided with a vacuum pump 18 connected to the treating chamber on the inlet side of the pump by a pipe 19 controlled by a valve 20. On its discharge side, the vacuum pump may either waste gas through pipe 21 controlled by valve 22 or may supply it through pipe 23 controlled by valve 24 to the inlet side of a gas compressor 25 which feeds through a pipe 26 to a storage tank 27, connected to the treating chamber by a pipe 28 controlled by a valve 29.

When a charge enters the curing chamber, the chamber is first evacuated, wasting the air passing through the vacuum pump, and then carbon dioxide is introduced from the storage and additional carbon dioxide is provided from the generator. The treating gas need not be pure, but may contain nitrogen or oxygen, which are effectively inert, in addition to carbon dioxide.

The pick up of carbon dioxide in the brick as a result of the curing treatment is in the range between 0.25 and 2.5 percent, preferably 1 percent on the total weight of the dry refractory components of the brick.

Brick made in accordance with the above procedure have a modulus of rupture at room temperature of 1500 p. s. i. or more.

When the brick of the present invention are heated to 1200° C., the strength at this intermediate temperature is much higher than that of ordinary brick. While the brick according to my U. S. Patents Nos. 1,859,512 and 1,992,482 have a modulus of rupture at 1200° C. of only about 250 p. s. i., typical brick made according to the present invention have a modulus of rupture at 1200° C of 750 p. s. i. and many run even as high as 1200 p. s. i. The brick according to the present invention have a modulus of rupture at 800° C. which is even higher than that at 1200° C.

While the greatly improved strengths at intermediate temperature are important characteristics of the brick of the invention, the negligably small shrinkage in volume on heating to 1650° C. and cooling to room temperature is an equally important feature of the invention. Prior art unfired magnesia brick on heating to 1650° C. and cooling to room temperature have exhibited a volume shrinkage of at least 15 percent, whereas the brick of the invention in most cases shrink only about 1 percent and in any case have a volume shrinkage less than 2 percent. The low shrinkage results in minimizing shrinkage cracking and avoiding the corresponding loss which occurs.

The very desirable properties of low shrinkage and high strength at intermediate temperatures are caused by the action of the metallic iron powder present in the mix. This finely divided metallic iron is in contact with the particles of magnesia in the refractory. When the brick is dried (or dried and cured) a low temperature bond is developed by the magnesia particles reacting with magnesium sulphate and moisture present in the brick mix. But when the brick are heated to intermediate temperatures, these magnesia bonding compounds are broken down with the loss of their volatile components. In this manner much of the strength of the brick derived from this source is lost. However, when temperatures are reached in the intermediate range between 800° C. and 1200° C., the finely divided iron powder begins to oxidize. The oxidation may continue until the iron forms ferric oxide. The iron oxide, usually ferric oxide, reacts with the magnesia to form a bond which is believed to be magnesium ferrite, $MgO \cdot Fe_2O_3$. To produce magnesium ferrite a mixture of metallic iron of specific gravity about 7.8 and magnesia of specific gravity about 3.65 reacts to form magnesium ferrite of specific gravity about 4.6. One part of iron yields 1.428 parts of ferric oxide which then combines with 0.357 part of magnesia, yielding 1.78 parts of magnesium ferrite. This procedure is accompanied by a volume expansion. Thus the formation of magnesium ferrite on the surface of the magnesia particles and the simultaneous expansion produce a crystalline bond which acts to bridge the void spaces which form between the individual magnesia particles when the volatile components of the original bonding substances are driven off. In this way a new bond is created which is crystalline and highly refractory. This new bond is much superior to the clay bond of the U. S. patents above referred to, as demonstrated by the high modulus of rupture.

60 percent; $Fe_2O_3$ about 14 percent; MgO about 14 percent.

The iron powder employed may be commercial sponge iron powder which is available for use in the so-called powder metallurgy process in which metallic objects are formed by pressing metallic powder under high pressure and sintering. This is essentially iron with small amounts of impurities. Any other composition of iron powder may be used, such as that obtained by reducing oxides of iron such as mill scale with gaseous reducing agents. The iron powder may also be made by grinding commercial cast iron. Products of machining may also be used where the size is adequately fine, such as plain carbon steel, or austenitic or ferritic stainless steel.

Typical examples of the compositions of the invention embodying the principles above set forth are shown by the following table:

| Example No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Refractory components: | | | | | | | | | | | | | | | | |
| Coarse magnesia, 8 x 35 mesh, percent | 60 | 45 | 70 | 65 | 45 | 55 | 62 | 50 | 70 | 70 | 65 | 65 | 40 | 20 | | 60 |
| Coarse chromite, 6 x 28 mesh, percent | | | | | | | | | | | | | 20 | 40 | 60 | |
| Fine magnesia through 45 mesh, percent | 30 | 45 | 25 | 25 | 50 | 35 | 35 | 35 | 25 | 25 | 25 | 25 | 30 | 32 | 32 | 20 |
| Fine chromite through 48 mesh, percent | | | | | | | | | | | | | | | | 10 |
| Iron powder through 28 mesh, percent | 10 | 10 | 5 | 10 | 5 | 10 | 3 | 15 | 5 | 5 | 10 | 10 | 10 | 8 | 8 | 10 |
| Bond and Cure: | | | | | | | | | | | | | | | | |
| Sulphuric acid, percent | 1 | 1 | .1 | .1 | 1 | .1 | .1 | .1 | 0.5 | .3 | | | .1 | 1 | .1 | .1 |
| Magnesium sulphate, percent | | | | | | | | | | | 0.5 | 1.3 | | | | |
| Carbon dioxide, percent | | | | | | | | | | | .1 | .1 | .1 | | | |

I am aware of proposals by others that refractory products be made from a mixture of chrome ore, periclase and iron oxide. Iron oxide when employed in the manufacture of magnesia-bearing refractories causes shrinkage of the magnesia. I have used iron oxide in the production of magnesia-bearing refractories, and have found that it is very inferior to metallic iron particles both in bonding and in eliminating shrinkage at high temperature in magnesia refractories. Whereas iron oxide has no ability to expand, iron particles are potentially expanding.

Where high temperature service is to be encountered, it is preferred to use electrically fused magnesia in making my refractory. For lower temperature service I obtain desirable results with periclase manufactured by precipitating magnesium hydroxide from brine or sea water and calcining the hydroxide with additions to form a dense grained product of a bulk specific gravity of about 3.10. I also may use dead-burned magnesite obtained by calcining natural magnesium carbonate.

A typical range of analysis for refractory magnesia suitable for use in the present invention is as follows: $SiO_2$, ½ to 7 percent; $Fe_2O_3$, trace to 6 percent; $Al_2O_3$, 0.2 to 2 percent; CaO, trace to 5 percent; MgO, 80 to 99.5 percent. Typical individual analyses for different forms of magnesia which may be used are as follows:

| | Elec. Fused Magnesia | Periclase | Dead-burned Magnesite |
|---|---|---|---|
| $SiO_2$ | 1.0 | 5.33 | 6.58 |
| $Fe_2O_3$ | | 0.40 | 4.30 |
| $Al_2O_3$ | 1.2 | 0.72 | 1.85 |
| CaO | 0.3 | 1.36 | 3.55 |
| MgO | 97.3 | 92.06 | 83.64 |

The chromite used may have a typical analysis as follows, which is representative of any good refractory chromite: $SiO_2$, trace to 8 percent; $Cr_2O_3$, 30 to 50 percent; $Cr_2O_3$ plus $Al_2O_3$ about All mesh given are in Tyler standard mesh per linear inch.

All percentages given herein are percentages by weight on the total dry refractory components, except the percentage of shrinkage. The magnesia, chromite (if any) and iron make up the total dry refractory components, and total 100 percent. The percentage of bond, of water and of carbon dioxide are not included in the dry refractory components, but are based on the total thereof.

The brick of the present invention are suitable for use in high temperature service such as walls and roofs of basic open hearth steel furnaces and and copper reverbatory furnaces without previous firing.

In view of my invention and disclosure, variations and modifications to meet individual whim or particular need will doubtless become evident to others skilled in the art, to obtain all or part of the benefits of my invention without copying the structure and process shown, and I, therefore, claim all such insofar as they fall within the reasonable spirit and scope of my claims.

Having thus described my invention what I claim as new and desire to secure by Letters Patent is:

1. A basic refractory brick, unfired and suitable for use in unfired condition, comprising from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and chromite particles, and from 3 to 15 percent of iron particles through 28 mesh.

2. A basic refractory brick, unfired and suitable for use in unfired condition, comprising from 50 to 60 percent of coarser refractory particles of the class consisting of magnesia particles between 8 and 35 mesh and chromite particles between 6 and 28 mesh, from 30 to 40 percent of finer refractory particles through 65 mesh of the class consisting of magnesia particles and chromite particles, and from 8 to 12 percent of iron particles through 35 mesh.

3. A basic refractory brick, unfired and suitable for use in unfired condition, comprising from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and chromite particles, from 3 to 15 percent of iron particles through 28 mesh and a binder.

4. A basic refractory brick, unfired and suitable for use in unfired condition, comprising from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and chromite particles, from 3 to 15 percent of iron particles through 28 mesh and from 0.5 to 3 percent of sulphuric acid on the total of the dry refractory components.

5. A basic refractory brick, unfired and suitable for use in unfired condition, comprising from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and a mixture of magnesia particles and chromite particles to the extent of not more than 10 percent of the brick, from 3 to 15 percent of iron particles through 28 mesh and from 0.5 to 3 percent of magnesium sulphate on the total of the dry refractory components.

6. A basic refractory brick, unfired and suitable for use in unfired condition, comprising from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and a mixture of magnesia particles and chromite particles to the extent of not more than 10 percent of the brick, from 3 to 15 percent of iron particles through 28 mesh, a binder and from 0.25 to 2.5 percent of carbon dioxide on the total of the dry refractory components.

7. A basic refractory brick, unfired and suitable for use in unfired condition, comprising from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and a mixture of magnesia particles and chromite particles to the extent of not more than 10 percent of the brick, from 3 to 15 percent of iron particles through 28 mesh, from 0.5 to 3 percent of sulphuric acid on the total of the dry refractory components and from 0.25 to 2.5 percent of carbon dioxide on the total of the dry refractory components.

8. A basic refractory brick, unfired and suitable for use in unfired condition, comprising from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and a mixture of magnesia particles and chromite particles to the extent of not more than 10 percent of the brick, from 3 to 15 percent of iron particles through 28 mesh, from 0.5 to 3 percent of magnesium sulphate on the total of the dry refractory components and from 0.25 to 2.5 percent of carbon dioxide on the total of the dry refractory components.

9. The process of making an unfired basic refractory brick which is of increased strength at intermediate temperature, which comprises mixing from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and chromite particles and from 3 to 15 percent of iron particles through 28 mesh, molding the mix into a brick and drying the brick.

10. The process of making an unfired basic refractory brick which is of increased strength at intermediate temperature, which comprises mixing from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and chromite particles, and from 3 to 15 percent of iron particles through 28 mesh and a binder, molding the mix into a brick and drying the brick.

11. The process of making an unfired basic refractory brick which is of increased strength at intermediate temperature, which comprises mixing from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and chromite particles, from 3 to 15 percent of iron particles through 28 mesh and from 0.5 to 3 percent of sulphuric acid on the total of the dry refractory components, molding the mix into brick and drying the brick.

12. The process of making an unfired basic refractory brick which is of increased strength at intermediate temperature, which comprises mixing from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and chromite particles, from 3 to 15 percent of iron particles through 28 mesh, and from 0.5 to 3 percent of magnesium sulphate on the total of the dry refractory components, with water, molding the mix into brick and drying the brick.

13. The process of making an unfired basic refractory brick which is of increased strength at intermediate temperature, which comprises mixing from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and a mixture of magnesia particles and chromite particles to the extent of not more than 10 percent of the brick, from 3 to 15 percent of iron particles through 28 mesh, and a binder, molding the mix into brick, curing the brick with carbon dioxide and drying the brick.

14. The process of making an unfired basic refractory brick which is of increased strength at intermediate temperature, which comprises mixing from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and a mixture of magnesia particles and chromite particles to the extent of not more than 10 percent of the brick, from 3 to 15 percent of iron particles through 28 mesh, and from 0.5 to 3 percent of sulphuric acid on the total of the dry refractory components, molding the mix into brick, curing the brick with carbon dioxide and drying the brick.

15. The process of making an unfired basic refractory brick which is of increased strength at intermediate temperature, which comprises mixing from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and a mixture of magnesia particles and chromite particles to the extent of not more than 10 percent of the brick, from 3 to 15 percent of iron particles through 28 mesh, and from 0.5 to 3 percent of magnesium sulphate on the total of the dry refractory components, with water, molding the mix into brick, curing the brick with carbon dioxide and drying the brick.

16. The process of making an unfired basic refractory brick of increased strength at intermediate temperature, which comprises mixing from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and a mixture of magnesia particles and chromite particles to the extent of not more than 10 percent of the brick, and from 0.5 to 3 percent of sulphuric acid, subsequently mixing from 3 to 15 percent of iron particles through 28 mesh with the other ingredients, molding the mix into a brick and drying the brick.

17. The process of making an unfired basic refractory brick of increased strength at intermediate temperature, which comprises mixing from 45 to 70 percent of coarser refractory particles of the class consisting of magnesia particles between 6 and 35 mesh and chromite particles between 6 and 28 mesh, from 25 to 50 percent of finer refractory particles through 48 mesh of the class consisting of magnesia particles and a mixture of magnesia particles and chromite particles to the extent of not more than 10 percent of the brick, and from 0.5 to 3 percent of sulphuric acid on the total weight of the dry refractory components, and from 2 to 5 percent of water on the weight of the dry refractory components, subsequently incorporating from 3 to 15 percent of iron particles through 28 mesh in the mix, molding the mix into brick, curing the brick with carbon dioxide and drying the brick.

RUSSELL PEARCE HEUER.

References Cited in the file of this patent

UNITED STATES PATENTS

| Number | Name | Date |
|---|---|---|
| 1,715,449 | Curtis | June 4, 1929 |
| 2,283,250 | Goldschmidt, et al. | May 19, 1942 |
| 2,394,304 | Griffith | Feb. 5, 1946 |

FOREIGN PATENTS

| Number | Country | Date |
|---|---|---|
| 119,101 | Great Britain | 1918 |